(12) United States Patent
Tester et al.

(10) Patent No.: US 12,235,175 B2
(45) Date of Patent: Feb. 25, 2025

(54) SENSOR

(71) Applicant: KISTLER HOLDING AG, Winterthur (CH)

(72) Inventors: Michael Tester, Zurich (CH); Michael Mueller, Schlatt (CH); Peter Charles Tack, Venice, FL (US); Christof Sonderegger, Zurich (CH)

(73) Assignee: Kistler Holding AG, Winterthur (CH)

( * ) Notice: Subject to any disclaimer, the term of this patent is extended or adjusted under 35 U.S.C. 154(b) by 616 days.

(21) Appl. No.: 17/433,810

(22) PCT Filed: Feb. 19, 2020

(86) PCT No.: PCT/EP2020/054339
§ 371 (c)(1),
(2) Date: Aug. 25, 2021

(87) PCT Pub. No.: WO2020/173786
PCT Pub. Date: Sep. 3, 2020

(65) Prior Publication Data
US 2022/0146355 A1 May 12, 2022

Related U.S. Application Data
(60) Provisional application No. 62/811,140, filed on Feb. 27, 2019.

(30) Foreign Application Priority Data

Mar. 15, 2019 (EP) .................... 19163091

(51) Int. Cl.
*G01L 19/14* (2006.01)
*G01L 9/06* (2006.01)
(Continued)

(52) U.S. Cl.
CPC .............. *G01L 19/147* (2013.01); *G01L 9/06* (2013.01); *G01L 19/0046* (2013.01); *G01L 19/04* (2013.01)

(58) Field of Classification Search
CPC ..... G01L 19/147; G01L 9/06; G01L 19/0046; G01L 19/04
(Continued)

(56) References Cited

U.S. PATENT DOCUMENTS 3,965,746 A 6/1976 Rabek
4,764,747 A 8/1988 Kurtz et al.
(Continued)

FOREIGN PATENT DOCUMENTS

CN 102057265 A * 5/2011 ......... G01L 19/0046
JP S5550132 A 4/1980
(Continued)

OTHER PUBLICATIONS

Foreign office action with English translation for CN application No. 2022101202666030, Oct. 17, 2022, 26 pages.
(Continued)

*Primary Examiner* — Alexander A Mercado
*Assistant Examiner* — Rodney T Frank
(74) *Attorney, Agent, or Firm* — Dority & Manning, P.A.

(57) ABSTRACT

A pressure sensor includes a supporting member, a membrane and a jacket that define a sensor space in which a measuring element is arranged. A liquid fills the sensor space and surrounds the measuring element.

18 Claims, 5 Drawing Sheets

(51) Int. Cl.
   *G01L 19/00* (2006.01)
   *G01L 19/04* (2006.01)
(58) Field of Classification Search
   USPC .......................................................... 73/756
   See application file for complete search history.

(56) References Cited

U.S. PATENT DOCUMENTS

| | | |
|---|---|---|
| 2008/0245152 A1 | 10/2008 | Louwagie et al. |
| 2009/0308170 A1 | 12/2009 | Broden |
| 2011/0174080 A1 | 7/2011 | Zorzetto et al. |
| 2011/0303023 A1 | 12/2011 | Belcher et al. |
| 2013/0167650 A1 | 7/2013 | Albicker et al. |
| 2014/0013853 A1* | 1/2014 | Wohlgemuth .......... G01L 19/06 73/716 |
| 2015/0185103 A1 | 7/2015 | Fahimi et al. |
| 2015/0369680 A1 | 12/2015 | Ashino |

FOREIGN PATENT DOCUMENTS

| | | |
|---|---|---|
| JP | H0138511 Y2 | 11/1989 |
| JP | Y-1996-001468 | 1/1996 |
| JP | A-2010-203977 | 9/2010 |
| JP | A-2012-168204 | 9/2012 |
| JP | A-2013-104754 | 5/2013 |
| JP | A-2016-198791 | 12/2016 |
| WO | WO 2015/194105 | 4/2017 |

OTHER PUBLICATIONS

Japanese Office Action with English translation for application No. 2023-004283, Mar. 16, 2023, 4 pages.
Japanese Decision of Rejection with English translation for application No. 2021-547848, Sep. 15, 2022, 5 pages.
JP Office Action with Translation, Sep. 19, 2023, 12 pages.

* cited by examiner

SENSOR

CROSS-REFERENCE TO RELATED APPLICATIONS

The present application claims priority to International application serial No. PCT/EP2020/054339, which is hereby incorporated herein in its entirety by this reference for all purposes.

TECHNICAL FIELD

The invention relates to a pressure sensor adapted to measure a pressure of a medium, wherein a measuring element of the pressure sensor and the medium are separated.

BACKGROUND ART

Pressure sensors are used in multiple applications to determine the pressure of a medium in a measuring region. Such mediums include liquids or gasses, which can be corrosive or toxic. In order to protect the measuring element from exposure to corrosive mediums and to be able to clean the sensor easily from toxic mediums, the medium is usually separated from the measuring element by a membrane. The measuring element is arranged in a sensor space behind the membrane. The pressure of the medium acting on the membrane is transferred by a fluid to the measuring element, which fluid is filled in the sensor space. Such a pressure sensor is known from WO2012027853A1, which corresponds to US Patent Application Publication No. 2013-0167650, which is hereby incorporated herein by this reference for all purposes. According to WO2012027853A1, a measuring element is arranged in a sensor space. The sensor space is bounded by a supporting member, the membrane and a jacket. The sensor space is filled with a fluid through a filling duct and the fluid surrounds the measuring element. The membrane separates the fluid from the medium in the measuring region. The fluid is usually not compressible so that the membrane does not bulge much when the pressure changes in the measuring region.

A drawback of this sensor is that upon a change of the temperature of the sensor, the fluid is expanding or contracting according to the thermal expansion coefficient of the fluid. As the sensor space is not increasing accordingly, the additional or less space the fluid takes up is realized by a bulging of the membrane. Due to the limited elasticity of the membrane, an increase or decrease of the pressure of the fluid inside the sensor space inherent to the bulging of the membrane. This increase or decrease in pressure is determined by the measuring element. This is an adverse effect, as the determined pressure change is not corresponding to a pressure change of the medium but rather to the temperature change of the pressure sensor. The adverse effect is even more distinct for pressure sensors with a small membrane diameter of less than 6 mm (mm refers to millimeters), as membranes with a small area are less flexible than membranes with a few centimeters diameter.

Furthermore, small membranes are known to have a distinct clicker behavior, sometimes called cricket behavior. The clicker behavior refers to a sudden movement of a thin sheet of metal, like a membrane, from one alignment to another alignment, wherein the alignments are different stable states of the membrane. Such a sudden movement usually goes along with a clicking sound and an abrupt change of the pressure of the fluid. The sudden movement may happen upon a slow change of the medium pressure or a slow change of the pressure sensor's temperature, both resulting in a movement of the membrane. Such a clicker behavior changes the pressure of the fluid abruptly without a corresponding abrupt change of the medium's pressure, thus resulting in incorrect measurement of the medium's pressure.

OBJECTS AND SUMMARY OF THE INVENTION

The task of the invention is to reduce the temperature dependence of the sensor due to the thermal expansion of the fluid. A second task of the invention is to allow a cost effective production of such a pressure sensor having a reduced temperature dependence.

At least one of the tasks is solved by the features described below.

The invention relates to a pressure sensor for determining a pressure in a measuring region, the pressure sensor having a measuring element; wherein the measuring element is arranged in a sensor space; wherein the sensor space is bounded by at least a supporting member, a membrane and a jacket; wherein the sensor space is filled with a fluid and the fluid surrounds the measuring element; wherein the membrane separates the fluid medium from the measuring region, wherein at least one filler body is arranged in the sensor space.

The filler bodies fill up space in the sensor space otherwise filled with fluid, thus lowering the amount of fluid in the sensor space. The thermal expansion of a lower amount of fluid takes up less additional space. Thus, the bulging of the membrane is lower and the increase in pressure due to the thermal expansion of the fluid is lessened.

The invention also relates to a pressure sensor for determining a pressure in a measuring region, the pressure sensor having a measuring element; wherein the measuring element is arranged in a sensor space; wherein the sensor space is bounded by at least a supporting member, a membrane and a jacket; wherein the sensor space is filled with a fluid and the fluid surrounds the measuring element; wherein the membrane separates the fluid medium from the measuring region; wherein the membrane and the jacket are connected at an outer region of the membrane, wherein the membrane has a stiffening region which avoids a flexing of the stiffening region when pressure is applied to the membrane from the measuring region; and that the stiffening region protrudes from the plane of the membrane outer region towards the measuring element, thus decreasing the amount of fluid in the sensor space.

The stiffening region is important for the membrane to prevent a clicker behavior. The influence of the thermal expansion of the fluid is lessened by introducing the stiffening region to the membrane. Furthermore, the stiffening region is realized such, that it protrudes from the plane of the membrane outer region towards the measuring element, thus decreasing the amount of fluid in the sensor space. The thermal expansion of a lower amount of fluid takes up less additional space. Thus, the bulging of the membrane is lower and the increase in pressure due to the thermal expansion of the fluid is lessened.

The invention also relates to a pressure sensor for determining a pressure in a measuring region, the pressure sensor having a measuring element; wherein the measuring element is arranged in a sensor space; wherein the sensor space is bounded by at least a supporting member, a membrane and a jacket; wherein the sensor space is filled with a fluid and the fluid surrounds the measuring element; wherein the membrane separates the fluid medium from the measuring region, wherein the membrane has an outer region, at least one middle region and an inner region; that a bulge in the membrane separates the outer region from the middle region; that a bulge in the membrane separates the middle region from the inner region; that the bulge is flexible and acts as a flexible joint; and that the inner region is shiftable against the outer region.

The task of the membrane is to separate the medium in the measurement region from the measuring element in the sensor space of the pressure sensor while passing the pressure from the medium at the measuring region through the fluid to the measuring element. When the fluid expands due to the fluid's thermal expansion coefficient upon an increase in temperature of the sensor, the membrane deforms to make space for the additional volume taken by the fluid. In the state of the art, the membrane deforms in a spherically-domed way. By introducing a pre-formed bulge in the membrane between the outer region and the middle region and a pre-formed bulge between the middle region and the inner region of the membrane, the membrane may move more freely like a piston and a cylinder, with the inner region of the membrane being the piston and the outer region being the cylinder. The bulges act as flexible joints and allow the middle region to be shifted perpendicular to its surface against the outer region. The pressure needed to move the inner region of the membrane against the outer region is reduced by more than 20% of the force needed for an all-flat membrane with the same thickness and material.

Especially for membranes with a diameter of less than 6 mm, it was found that having exactly two bulges are most beneficial. More than two bulges and less than two bulges both effectively decrease the flexibility of the membrane, thus changing the pressure in the sensor space upon a temperature change of the sensor.

The invention relates to the three different technical interrelated solutions which yield a pressure sensor with a reduced temperature dependence.

BRIEF DESCRIPTION OF THE DRAWINGS

In the following the invention is explained exemplarily with reference to the figures. The figures show.

DETAILED DESCRIPTION OF EXEMPLARY EMBODIMENTS

Figure 1:
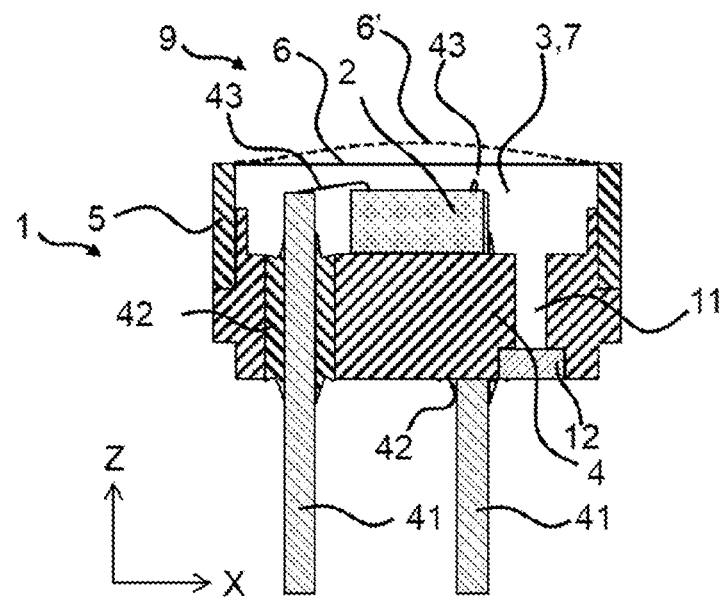
FIG. 1 a schematic representation of a sectional view of a pressure sensor known from the state of the art, FIG. 2 a schematic representation of a sectional view of one embodiment of a pressure sensor according to the invention, FIG. 3 a schematic representation of a sectional view of one embodiment of a pressure sensor according to the invention, FIG. 4A schematic representation of one embodiment of a first filler body part, FIG. 5A schematic representation of one embodiment of a first filler body part, FIG. 6A schematic representation of one embodiment of a second filler body part, FIG. 7A schematic representation of one embodiment of a second filler body part, FIG. 8A schematic representation of one embodiment of a membrane, FIG. 9A schematic representation of an enlarged sectional view of the membrane.

FIG. 1 shows a schematic representation of a sectional view of a pressure sensor 1 with a membrane 6 known from the state of the art for reference.

Figure 2:
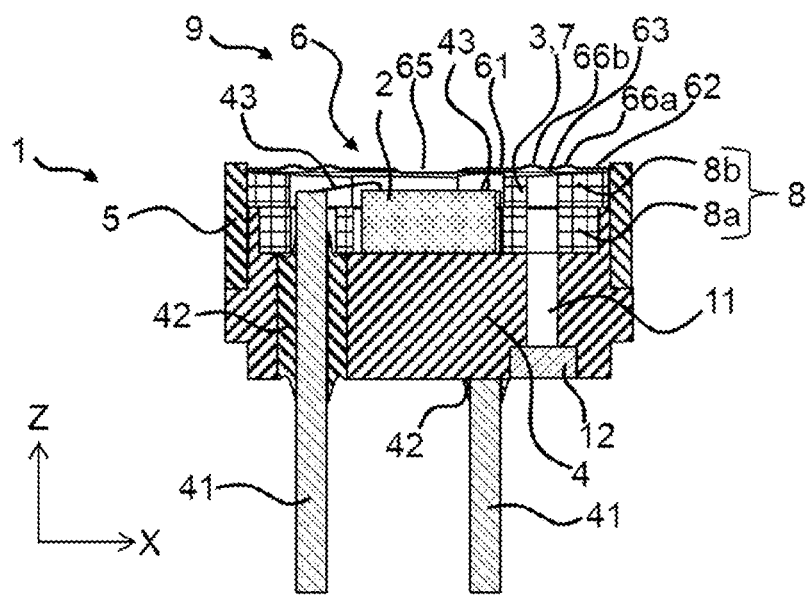

FIG. 2 shows a schematic representation of view of one embodiment of a pressure sensor 1 according to the invention. Elements known from the pressure sensor 1 shown in FIG. 1 according to the state of the art have the same reference numerals.

FIG. 1 and FIG. 2 both show a pressure sensor 1 with a membrane 6. The pressure sensor 1 has a cylindrical shape, with a longitudinal axis Z and a first radial axis X, and a second radial axis Y, which is normal to the plane of FIGS. 1 and 2, and thus both radial axis X and radial axis Y are perpendicular to the longitudinal axis Z and perpendicular to one another. The pressure sensor 1 has a measuring element 2 arranged in a sensor space 3. The sensor space 3 is in the interior of the sensor 1 and is bounded by the supporting member 4, the membrane 6 and the jacket 5. The pressure sensor is used to determine a pressure of a medium present in the measuring region 9, which measuring region 9 is external to the sensor 1 and is adjacent to the membrane 6 of the far side of the sensor space 3. The sensor space 3 is filled with a fluid 7, and the fluid 7 surrounds the measuring element 2. Since the sensor space 3 is bounded, the medium in the measuring region 9 and the fluid 7 are separated.

The fluid 7 is filled in the sensor space 3 through a tube 11 that is defined through and in the support member 4. After the fluid 7 is filled in the sensor space 4, the tube 11 is sealed with a cap 12. In one embodiment the cap 12 is welded or soldered to the support member 4. Of course, the tube 11 might be sealed in another fashion, like a cap 12 having a thread and a respective thread in the supporting member and a gasket for sealing. In one embodiment the cap 12 is attached to the support member 4 by adhesive.

The measuring element 2 is electrically connected to at least two contact elements 41, which pass through the supporting member 4 and protrude externally from the back side of the pressure sensor 1. The back side of the pressure sensor 1 being the opposing side to the front side of the pressure sensor 1, where the membrane 6 is located. The contact element 41 is electrically insulated from the supporting member 4. The measuring element 2 is connected to each of said contact elements 41 by a conducting element 43. Depending on the type of measuring element 2, different numbers of contact elements 41 and conducting elements 43 may be used to electrically connect a measuring element 2.

The membrane 6 is a predominantly round sheet of metal with a predefined thickness between 0.005 mm and 0.100 mm (mm refers to millimeters), which is connected at the rim of the round sheet to the jacket 5 via material-locking like soldering or welding or the like. The jacket 5 is connected to the supporting member 4 via material-locking or form-fit or force-fit.

It is directly visible from comparing the pressure sensor 1 according to the state of the art shown in FIG. 1 with the pressure sensor 1 according to the invention in FIG. 2 that the amount of fluid 7 filling the sensor space 3 is much lower for the pressure sensor 1 shown in FIG. 2, as the sensor space 3 is partially filled with a filler body 8.

The pressure of the medium in the measuring region 9 to be determined acts on the membrane 6 and is transferred through the membrane 6 to the fluid 7 and through the fluid 7 to the measuring element 2. The fluid 7 is usually non-conducting, with a specific electrical resistance of $10^{10}$ Ωm or higher (Ω refers to Ohm and m to meter, $10^{10}$ refers to 10 to the power of 10) and a modulus of compressibility between 0.5 GPa and 10 GPa (GPa refers to Gigapascal). Due to the modulus of compressibility of the fluid 7, a movement of the membrane 6 upon an increase in the medium's pressure is not high and may be readily calculated for every geometry of the pressure sensor 1. The measuring element 2 is surrounded by the fluid 7 and determines the pressure of the fluid 7.

A temperature change of the pressure sensor 1 results in the fluid 7 in the sensor space 3 changing its volume due to the thermal expansion coefficient of the fluid 7. Since the sensor space 3 is bounded by the supporting member 4, the membrane 6 and the jacket 5, the pressure of the fluid 7 will change as it cannot expand or contract without having to work against said supporting member 4, membrane 6 and jacket 5. Therefore, the measuring element 2 shown schematically in FIG. 1 determines a change in the fluid's 7 pressure that is not caused by a change in the medium's pressure but rather is caused or induced by a temperature change of the pressure sensor 1.

This temperature induced pressure change is decreased in the pressure sensor 1 according to the embodiment of the invention schematically shown in FIG. 2, as the amount of fluid 7 is decreased by filling the sensor space 2 with at least one filler body 8.

Therefore, in accordance with the present invention, the volumetric thermal expansion coefficient of the filler body 8 must be significantly lower that the volumetric thermal expansion coefficient of the fluid 7. A satisfactory thermal expansion coefficient for the filler body 8 is less than 25% of the fluid's 7 volumetric thermal expansion coefficient.

The filler body 8 predominantly has the shape of the sensor space 3 and is arranged adjacent to the supporting member 4 and the jacket 5, leaving gaps of less than 0.1 mm space for the fluid 7 to fill between filler body 8 and jacket 5 and filler body 8 and the supporting member 4. For a cylindrical pressure sensor 1, the sensor space 3 is cylindrical and the filler body 8 is predominantly cylindrical in shape.

Figure 3:
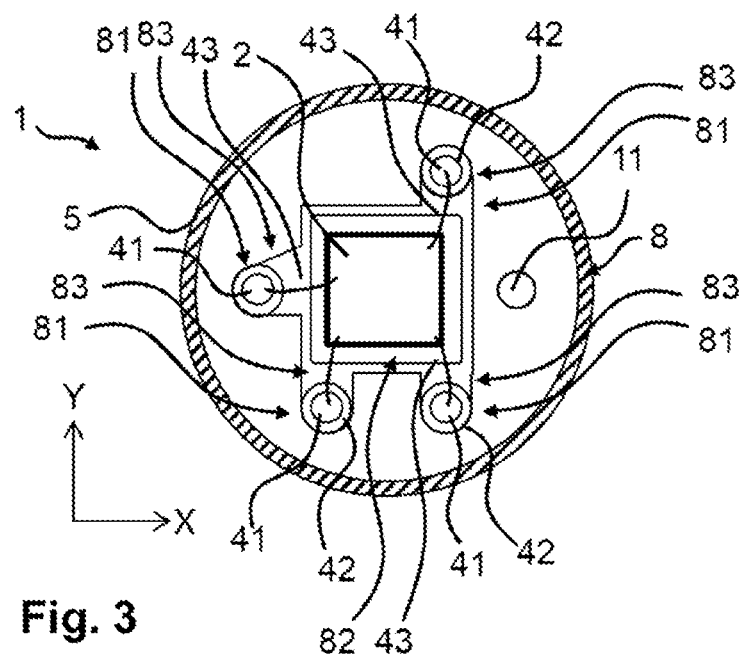
Figure 4:
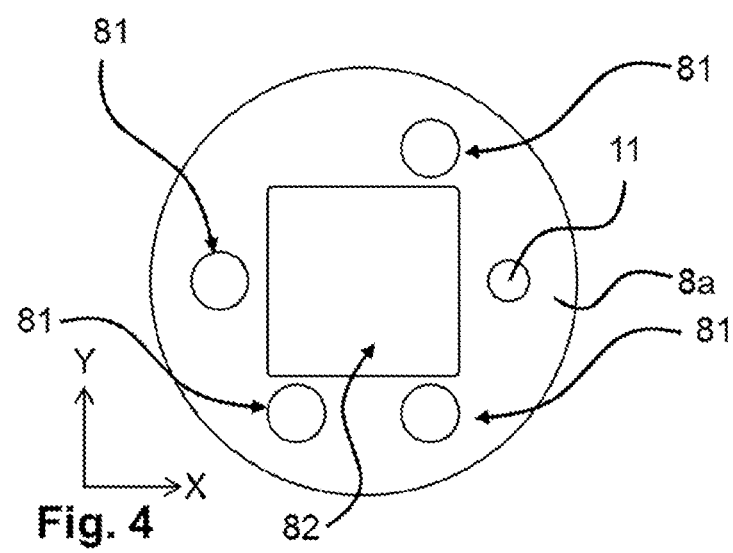
Figure 8:
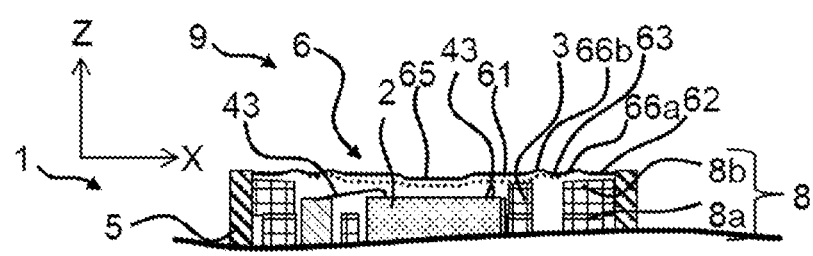

The filler body 8 may not interfere with the functionality of the pressure sensor 1 and therefore defines internally thereof a clearing 82 for the measuring element 2, a clearing 83 for each conducting element 43 and a clearing 81 for each contact element 41, as shown in FIG. 3, FIG. 4 and FIG. 8. The clearings 81, 82, 83 are made with a configuration to best fit the respective measuring element 2, conduction element 43 and contact element 41. This may lead to a complex shaped filler body 8, where the clearings 81, 82, 83 are carved from the filler body 8 and do not go through the filler body 8 from the filler body surface facing the membrane 6 to the filler body surface facing the supporting element 4.

In a presently preferred embodiment of the pressure sensor 1, at least two filler body parts 8a, 8b form a filler body 8, as is shown in FIG. 3, FIG. 4 and FIG. 8. This allows a cost effective production of the filler body 8 while maintaining its beneficial effect. The filler body 8 is divided in at least two parts 8a, 8b which both have a cylindrical shape and are stacked one on top of the other along the longitudinal axis, as is shown as an example on a two parted filler body 8 with one filler body part 8b atop another filler body part 8a shown in FIG. 2.

Figure 5:
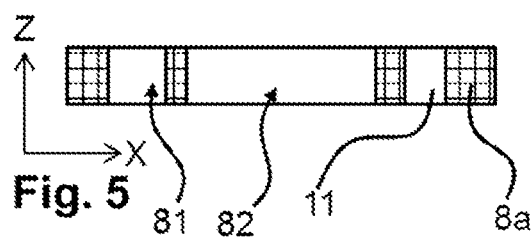

As shown in FIG. 2, a first filler body part 8a is arranged adjacent to the supporting member 4. This first filler body part 8a has a clearing 82 for a measuring element 2 and one clearing 81 for each contact element 41, as schematically shown in FIG. 4 and FIG. 5. The thickness of the first filler body part 8a is such, that the distance from the first filler body part 8a to the membrane 6 is longer than the distance from the membrane 6 to the contact element 41. Alternatively, the thickness of the first filler body part 8a is such that the distance from the first filler body part 8a to the membrane 6 is greater than the distance from the measuring element 2 to the membrane 6. The clearing 81 for the contact element 41 and the clearing 82 for the measuring element 2 are separated from another and thus do not intersect. Two clearings 81, 82, 83 are separated, if one clearing 81, 82, 83 cannot be reached by a straight line in the plane perpendicular to the longitudinal axis Z for every plane along the longitudinal axis Z.

As schematically shown in FIG. 2, a second filler body part 8b is arranged in between the first filler body part 8a and the membrane 6, filling the sensor space 3 up to close to the membrane 6. The remaining gap between the second filler body part 8b and the membrane 6 is chosen such that it is at least 0.05 mm bigger than the maximum amount the membrane 6 is moving towards the measuring element 2. The amount the membrane 6 is moving towards the measuring element 2 can be easily calculated from the sensor space 3 dimensions, the membrane dimension and the fluid's 7 thermal expansion coefficient, the fluid's 7 modulus of compressibility and the maximum allowed pressure of the medium in the measuring region 9 the pressure sensor 1 is approved for.

Figure 6:
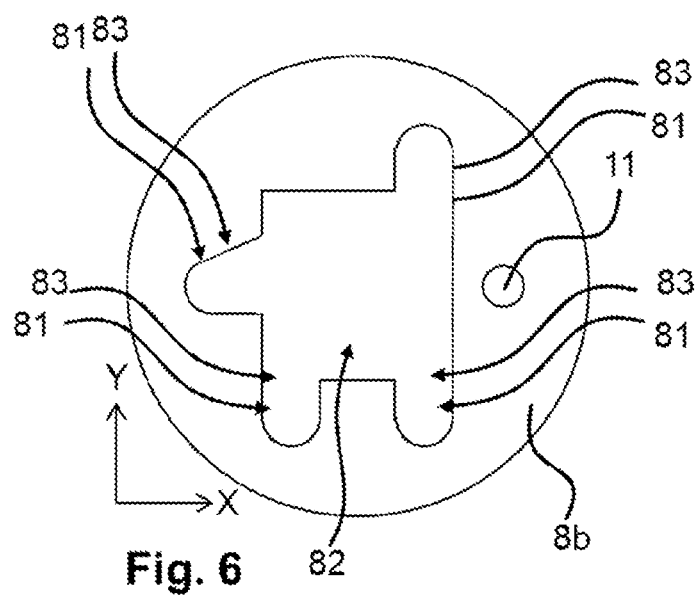
Figure 7:
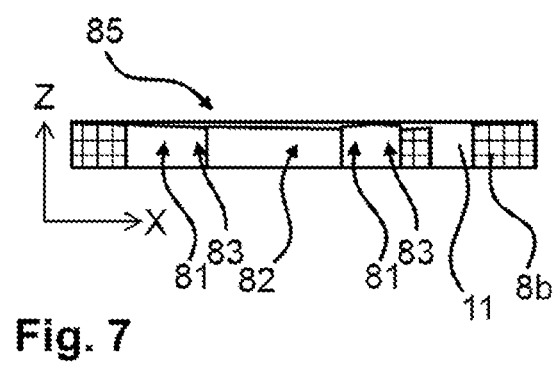

As schematically shown in FIGS. 6 and 7 for example, the second filler body part 8b has a clearing 82 for a measuring element 2 and one clearing 81 for each contact element 41, which is schematically shown in FIG. 3 for example. The conducting elements 43 are arranged in between the end surface of the conducting element 43 facing the membrane 6 and the surface of the measuring element 2 facing the membrane 6, and as such, in the same axis intercept of the longitudinal axis Z the second filler body part 8b is arranged in. For the second filler body part 8b each clearing 81 for a contact element 41 is connected to the clearing 82 for the measuring element 2 by a clearing 83 for a conducting element 43, in contrast to the first filler body part 8a which does not have a clearing 83 for a conducting element 43. Each clearing 81, 82, 83 is filled with the respective sensor, conducting or contact element 2, 41, 43 and an additional amount of fluid 7. Thus, having only clearings 81, 82, 83 in a filler body part 8b necessary for the respective elements reduces the amount of fluid 7 needed to fill the sensor space 3.

All clearings 81, 82, 83 in the first filler body part 8a and in the second filler body part 8b go through the respective filler body part 8a, 8b from its surface facing the membrane 6 to its surface facing the supporting element 4. The production of a clearing 81, 82, 83 as a through hole is much easier than complex shaped carvings of a filler body 8. Therefore, an at least two parted embodiment of the filler body 8 is easy and cost effective to produce with end to end clearings going through the filler body 8 and each filler body part 8a, 8b can be produced with a minimum of clearings, 81, 82, 83 thus reducing the amount of fluid 7 needed to fill the sensor space 3.

In a presently preferred embodiment, at least one filler body 8 consists of ceramic or glass material. Ceramic, and glass material has a low thermal expansion coefficient.

Furthermore, producing the filler body 8 in a suited geometry is easily achieved with ceramic, crystalline and glass material, for example by milling or grinding. In addition, ceramic, and glass material have a high electrical resistance, lowering the risk of having leakage current or short circuits between contact elements 41 and thus reducing the amount of deficient products and eventually reducing production costs.

In one embodiment of the pressure sensor 1, the filler body 8 closest to the membrane 6 features a concave shape 85, as shown in FIGS. 7, 8, 10 and 11 on the surface facing the membrane 6. It is understood that when the filler body 8 closest to the membrane is formed by two or more filler body parts 8a, 8b, the filler body part 8b closest to the membrane 6 features a concave shape 85 on the surface facing the membrane 6. When the membrane 6 moves upon a change of the pressure of the medium in the measuring region 9, the inner region 61 of the membrane 6 is dislocated a longer distance than the outer region 62, where the membrane 6 is connected to the jacket 5. When the membrane 6 moves towards the measuring element 2, it may not collide with the filler body 8, as shown in FIG. 8. The concave shape 85 of the filler body 8 surface facing the membrane 6 ensures that the membrane 6 may move without collision with the filler body 8 while the closest distance of the filler body 8 to the membrane 6 may be lower than 1 mm, in a presently preferred embodiment lower or equal 0.5 mm.

In a currently preferred embodiment of the pressure sensor 1, the concave shape 85 is a conical shape. Such a shape is easily formed by lathing or milling or grinding. Production of a filler body 8 with the concave shape 85 having a conical form therefore cost effective.

It should be noted that the concave shape 85 of the filler body 8 surface facing the membrane 6 is ideally suited to admit an optional stiffening region 65 of the membrane 6 to protrude towards the measuring element 2, thus interrelating both of said aspects.

A pressure sensor 1 described above is assembled such that the following steps are performed:
a. The measuring element 2 is connected to the supporting member 4 by form-fit or force-fit or material-locking;
b. the first filler body part 8a is placed adjacent to the supporting member 4 such that the measuring element 2 is arranged in the clearing 82 for the measuring element 2, and that the contact elements 41 are arranged in the clearing 81 for the contact element 41;
c. the conducting elements 43 are connected to the respective contact element 41 by form-fit or force-fit or material-locking; the conducting element 43 is connected to the measuring element 2 by form-fit or force-fit or material-locking;
d. the second filler body part 8b is placed adjacent to the first filler body part 8a such that the measuring element 2 is arranged in the clearing 82 for the measuring element 2, and that the contact elements 41 are arranged in the clearing 81 for the contact element 41, and the conducting element 43 is placed in the clearing 83 for the conducting element 43.

By following these steps, the pressure sensor 1 may be easily produced while the filler body parts 8a, 8b having only clearings 81, 82, 83 in a filler body part 8a, 8b necessary for the respective elements may be used, which reduces the amount of fluid 7 needed to fill the sensor space 3.

Of course, the pressure sensor 1 and the membrane 2 may in another embodiment have different geometries, like a rectangular shape or oval shape in its plane perpendicular to the longitudinal axis and a with a rectangular or oval membrane. Other geometries may be used as well for the invention.

In another embodiment of the pressure sensor 1 the membrane 6 has a stiffening region 65 which avoids a flexing of the stiffening region 65 when pressure is applied to the membrane 6 from the measuring region 9. The stiffening region 65 protrudes from the plane of the membrane 6 outer region 62 towards the measuring element 2, thus decreasing the amount of fluid 7 in the sensor space 3. This stiffening region prevents a clicker behavior, which otherwise may occur especially for membranes 6 with a small diameter of 6 mm or less if the membrane 6 is moved. Since movement of the membrane 6 may occur upon a temperature change due to the thermal expansion of the fluid 7, the stiffening region 65 is effectively lessening the effect of a temperature change of the pressure sensor 1 on the pressure determined by the measuring element 2. In addition, the stiffening region 65 protruding towards the measuring element 2 decreases the sensor space 3 and thus decreases the amount of fluid 7 needed to fill the sensor space 3. Therefore, the stiffening region 65 effectively lessens the effect of the temperature change of the pressure sensor 1 on the pressure determined by the measuring element 2.

In one embodiment of the pressure sensor 1, the stiffening region 65 is in an inner region 61 of the membrane 6, where a part of the surface of the membrane 6 is shifted perpendicular to the plane of the membrane 6 outer region 62. The shifted inner region 61 can be formed in the membrane 6 for example by stamping or drawing. Such a membrane 6 is easily producible from a flat sheet of metal. Stamping or drawing is a cost-effective way of introducing a structure in such a sheet of metal. It is known, that structuring of a sheet of metal increases its stability.

In another embodiment of the pressure sensor 1, the thickness of the membrane 6 is constant when measured perpendicular to the surface of the membrane 6, wherein constant is understood as the thickness being constant with a thickness tolerance of less than 20% of the thickness of the membrane 6. Maintaining a constant thickness of the membrane 6 ensures a uniform movement of the membrane 6. In a circular membrane 6 for example, all points lying on the same radius of the circular membrane 6 should move the same distance when the membrane 6 is moving. If the thickness is not constant over the membrane 6, especially on the same radius, a clicker behavior is more likely, resulting in sudden changes in the pressure determined by the measuring element 2 upon a temperature induced change of the fluid's 7 volume and the resulting movement of the membrane 6.

Figure 9:
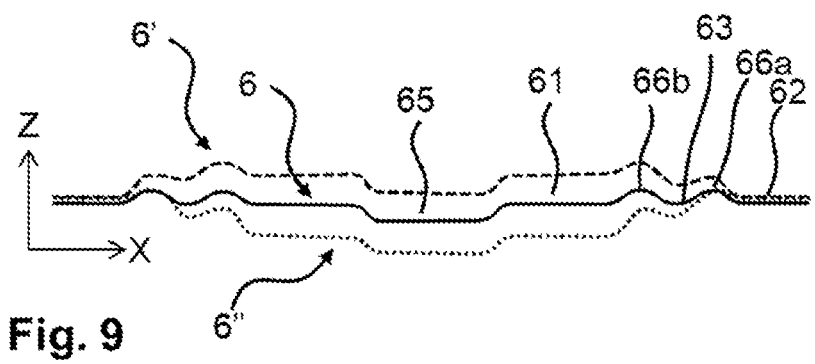
Figure 10:
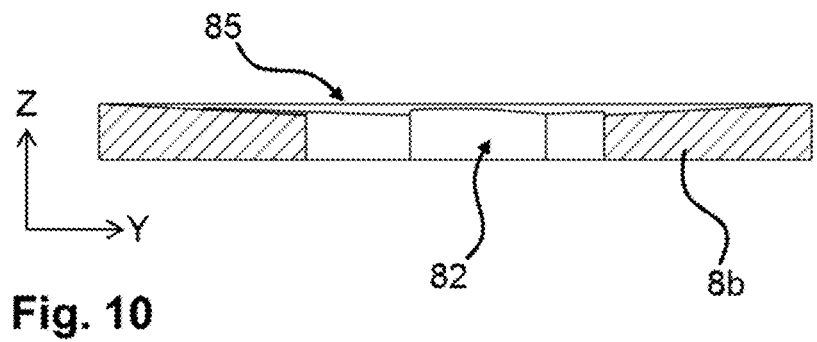
FIG. 10A schematic representation of front elevation of the second filler body part depicted in FIG. 7, and FIG. 11A schematic representation of a perspective view of the second filler body part depicted in FIG. 7.
Figure 11:
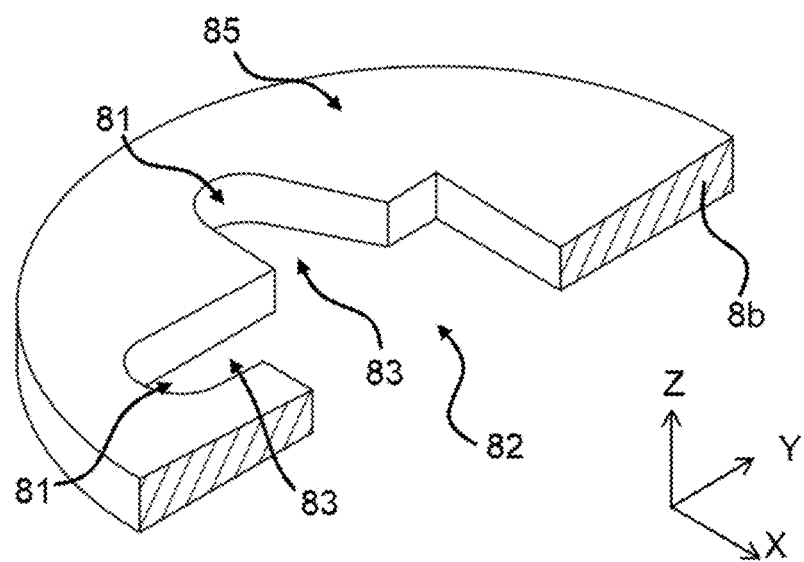

In another embodiment of the pressure sensor 1 the membrane 6 has an outer region 62, at least one middle region 63 and an inner region 61. As schematically shown in FIGS. 2, 8 and 9, a bulge 66a in the membrane 6 separates the outer region 62 from the middle region 63. Another bulge 66b in the membrane 6 separates the middle region 63 from the inner region 61. Each bulge 66a, 66b is flexible and acts as a flexible joint. The inner region 61 is shiftable against the outer region 62.

In general, an impermeable membrane 6 does not allow a change of a volume of the fluid 7 in the sensor space 3 without introducing a pressure change in the fluid 7. An inflexible membrane, for example a several millimeter thick sheet of metal, will act against being moved, so that a much higher pressure is needed for a movement of a sheet of metal that is several millimeters thick than for the movement of a thin membrane 6 being only few tens of micrometers thick. However, a flat membrane of a few tens of micrometer thickness will deform in a spherically-domed manner, as shown by the dashed line depicturing the deformation of a membrane 6' in FIG. 1. This spherically-domed deformation of the membrane 6' according to the state of the art is disadvantageous, as it wears the membrane by putting a high stress on the material, thus being a reason for failure of the membrane. A higher flexibility of the membrane 6 allows the fluid 7 to change its volume upon a temperature change of the fluid 7 with a much smaller increase in pressure of the fluid 7. The flexibility of the membrane 6 is in one embodiment of the invention enhanced by introducing at least two bulges 66 to the membrane 6, as shown in FIG. 2, FIG. 8 and FIG. 9. A bulge 66 is a permanent deformation of an otherwise flat sheet of metal, wherein the metal of the bulge 66 is dislocated out of the plane of the sheet of metal. The maximum distance from the plane of the sheet of metal to dislocated metal of the bulge 66 is called bottom of the bulge 66. The bulge 66 is introduced such, that the bottom of the bulge 66 forms a closed line in a plane shifted perpendicular to the plane of the sheet of metal. In a cross-section perpendicular to the plane of the sheet of metal and perpendicular to the closed line on the bottom of the bulge 66 is shaped like a continuously differentiable function, with the line of the shape following a negative curvature out of the plane of the sheet of metal for about 90°, which smoothly passes into a positive curvature of about 180°, which smoothly passes into a negative curvature of about 90°. Radii of the curvature are chosen such that in result the line is passing back into the plane of the sheet of metal.

Such a bulge 66 is a flexible joint, as the sheet of metal, in this case the membrane 6, readily may be further bend along the already existing curvatures. Introducing a bulge 66 is therefore beneficial for the movement of the membrane 6 upon a change of the volume of the fluid 7 due to a temperature change of the fluid 7, as the movement is more defined and the risk of a clicker behavior, which occurs often in flat sheets of metal, is decreased. This is also beneficial if the movement of the membrane 6 is due to a pressure change in the measuring region.

It has been found that, especially for membranes with a low diameter of 6 mm or less, two bulges 66 are most beneficial. Here, the membrane 6 has a flat outer region 62, a flat inner region 61 and a flat middle region 63, all of which are in the same plane. An optional stiffening region 65 in the inner region 61 is not in conflict with the upcoming description, an inner region 61 having a stiffening region 65 is still for convenience sake seen as being flat. The outer region 62 and the middle region 63 are separated by a bulge 66. The middle region 63 and the inner region 61 are separated by a bulge 66. The middle region 63 might in one embodiment be only line shaped between two bulges 66, which line is on the same plane as the outer region 62, as shown in FIG. 6 and FIG. 7 and FIG. 9.

FIG. 9 shows the membrane only, omitting other elements of the sensor for the sake of clarity. Upon a change of the volume of the fluid 7 in the sensor space 3 upon a temperature change of the fluid 7, the bulge 66 between outer region 62 and middle region 63 will allow a movement of the middle region 63 out of the plane of the adjacent surrounding portion of the membrane 6. The dotted line in FIG. 9 shows the membrane 6" when the volume of the fluid 7 is decreased upon a decrease of the fluid's 7 temperature. The dashed line in FIG. 9 shows the membrane 6' when the volume of the fluid 7 is increased upon an increase of the fluid's 7 temperature. The plane of the middle region 63 remains parallel to the plane of the outer region 62. The bulge 66 between middle region 63 and inner region 61 will allow a movement of the inner region 61 even further out of plane than the middle region 63. The plane of the middle region 63 remains parallel to the plane of the outer region 62. With two bulges 66a, 66b, the inner region 61 is shiftable against the outer region 62 in a piston-like fashion, rendering the movement steady and reproducible. Therefore, upon a temperature induced change in the fluid's 7 volume, the movement of the inner region 61 is easily achieved, rendering the pressure increase in the fluid 7 minimal due to high flexibility of the membrane 6 with two bulges 66a, 66b.

It should be noted that an optional stiffening region 65 supports the piston-like behavior by introducing additional stiffness to the inner region 61, thus interrelating both of said aspects.

Of course, a membrane 6 with more than two bulges 66 may be conceived, with an additional middle region 63. However, the movement of the inner region 61 against the outer region 62 is not as steady and defined, which might lead to sudden changes in the fluid's 7 pressure upon a temperature induced volume change of the fluid 7. However, the fluid's 7 increase in pressure will still be lower than without bulges 66 in the membrane 6.

A bulge 66 desirably is introduced to the membrane 6 by stamping or drawing. The process of stamping or drawing a structure, like a bulge 66, in a sheet of metal, like a membrane 6, is cost effective and may be easily introduced to the production process of a membrane 6.

The thickness of the membrane 6 having bulges 66 is still constant when measured perpendicular to the surface of the membrane 6, wherein constant is understood as the thickness being constant with a thickness tolerance of less than 20% of the thickness of the membrane 6.

The measuring element 2 of the pressure sensor 1 may be any of a piezoelectric measuring element, a piezoresistive measuring element, and a strain gage. Of course, a person known in the art might also choose a measuring element 2, where a capacity change or a change of the distance between two elements of the measuring element 2 is proportional to a pressure.

The invention is most important for pressure sensors 1 where the biggest dimension of the membrane 6 equals 6 mm or less, as the membrane 6 in these pressure sensors 1 is very stiff compared to membranes having a diameter of 10 mm or more. Therefore, an increase in the fluid's 7 pressure upon a temperature induced change in the fluid's 7 volume is more pronounced in pressure sensors 1 with such a membrane 6 of 6 mm diameter or less.

A pressure sensor 1 according to the invention is used to measure a pressure of a medium 10 in a measuring region 9. Especially in environments where the temperature of the medium, and accordingly the temperature of the fluid 7 in the sensor space 3, is subject to change, then the use of a pressure sensor 1 described above is beneficial. Such an environment may be inside an internal combustion engine, in a gas turbine, in gas, oil or other pipelines, in heating or cooling systems or in the aerospace and aviation industry.

It is understood that the different aspects and embodiments of the invention can be combined where possible and embodiments resulting from such a combination of embodiments described above are part of the invention as well.

LIST OF REFERENCE NUMERALS 1 sensor
2 measuring element 3 sensor space
4 supporting member
41 contact element
42 electrical insulation
43 conducting elements
5 jacket
6, 6', 6" membrane
61 inner region
62 outer region
63 middle region
65 stiffening region
66a, 66b bulge
7 fluid
8 filler body
8a, 8b first, second filler body part
81 clearing for contact element
82 clearing for sensor element
83 clearing for conducting element
85 concave shape
9 measuring region
11 tube
12 cap
X radial axis
Y radial axis
Z longitudinal axis

The invention claimed is:

1. Pressure sensor for determining a pressure in a measuring region, the pressure sensor elongating generally along a longitudinal axis and comprising: a supporting member, a membrane and a jacket that are disposed to bound a sensor space;
a measuring element disposed in the sensor space;
a fluid that surrounds the measuring element;
wherein the membrane separates the fluid from the measuring region;
wherein the membrane has an outer region that extends in an outer flat disposition generally parallel to a reference plane that lies normal to the longitudinal axis, wherein the outer region is fixed to the jacket;
wherein the membrane defines an inner region that extends in an inner flat disposition generally parallel to the reference plane that lies normal to the longitudinal axis, wherein the inner region is spaced apart from the outer region;
wherein the membrane defines a middle region that is disposed between the inner region and the outer region and extends in a direction from the inner region towards the outer region generally parallel to the reference plane that lies normal to the longitudinal axis;
wherein the membrane defines only a first flexible bulge that flexibly connects the outer region to the middle region;
wherein the membrane defines only a second flexible bulge that flexibly connects the middle region to the inner region;
wherein each of the first bulge and the second bulge is flexible and acts as a flexible joint that permits relative movement of the inner flat disposition of the inner region of the membrane in a direction along the longitudinal axis relative to the outer flat disposition of the outer region of the membrane;
wherein the shape of each of the first bulge and the second bulge in a cross-section perpendicular to the reference plane defines a line following a continuously differentiable function; and
wherein a disposition of the inner region is shiftable relative to a disposition of the outer region in the sense that the inner region of the membrane retains the inner flat disposition while being moveable in a direction along the longitudinal axis relative to the outer flat disposition of the outer region of the membrane.

2. Pressure sensor as in claim 1, wherein the membrane and the jacket are connected at an outer region of the membrane, wherein the membrane has a stiffening region which avoids a flexing of the stiffening region when pressure is applied to the membrane from the measuring region; and wherein the stiffening region protrudes from a plane of the membrane outer region towards the measuring element, thus decreasing the amount of fluid in the sensor space.

3. Pressure sensor according to claim 2, wherein the stiffening region is an area in an inner region of the membrane, where a part of the surface of the membrane is shifted perpendicular to the plane of an outer region of the membrane.

4. Pressure sensor according to claim 2, wherein the thickness of the membrane is constant when measured perpendicular to the surface of the membrane, wherein constant is understood as the thickness being constant with a thickness tolerance of less than 20% of the thickness of the membrane.

5. Pressure sensor according to claim 1, each of the first bulge and the second bulge is introduced to the membrane by stamping or drawing; and wherein the thickness of the membrane is constant when measured perpendicular to the surface of the membrane, wherein constant is understood as the thickness being constant with a thickness tolerance of less than 20% of the thickness of the membrane.

6. Pressure sensor according to claim 1, wherein the outer region of the membrane is configured to lie in a first flat plane, the inner region of the membrane is configured to lie in a second flat plane disposed parallel to the first flat plane, and the middle region of the membrane includes a third flat plane that lies between the first bulge and the second bulge.

7. Pressure sensor according to claim 6, wherein each of the first bulge and the second bulge extends in a convex shape in a direction perpendicular to the first flat plane.

8. Pressure sensor as in claim 1, further comprising: a first filler body arranged in the sensor space.

9. Pressure Sensor according to claim 8, wherein the first filler body has a volumetric thermal expansion coefficient of less than 25% of the volumetric thermal expansion coefficient of the fluid.

10. Pressure sensor according to claim 8, wherein the first filler body includes a first filler body part and a second filler body part.

11. Pressure sensor according to claim 10, further comprising: two contact elements that pass through the supporting member and that are electrically insulated from the supporting member; and conducting elements that connect the measuring element to said contact elements.

12. Pressure sensor according to claim 10, wherein the first filler body part is arranged adjacent to the supporting member; wherein the first filler body part has a clearing for a measuring element; wherein the first filler body part has one clearing for each contact element; wherein for said first filler body part the clearing for the contact element and the clearing for the measuring element are separated from another; wherein the second filler body part is arranged in between the first filler body part and the membrane; wherein the second filler body part has a clearing for a measuring element; wherein the second filler body part has one clearing for each contact element; wherein for said second filler body part each clearing for a contact element is connected to the clearing for the measuring element by a clearing for a conducting element.

13. Pressure sensor according to claim 8, wherein the filler body consists of ceramic or glass material; or wherein the filler body consists of a crystalline material.

14. Pressure sensor according to claim 10, wherein the second filler body part is disposed closer to the membrane than the first filler body part and defines a surface that faces the membrane and defines a concave shape.

15. Pressure sensor according to claim 8, wherein the measuring element is a piezoelectric measuring element or a piezoresistive measuring element or a strain gage.

16. Pressure sensor according to claim 8, wherein the combined inner region, middle region and outer region of the membrane does not extend beyond 6 mm in the direction along the reference plane.

17. Pressure sensor according to claim 8, wherein the measuring element is a piezoresistive measuring element.

18. Pressure sensor according to claim 8, wherein the measuring element is a strain gage.

* * * * *